United States Patent
Kolos et al.

(10) Patent No.: US 7,627,513 B2
(45) Date of Patent: Dec. 1, 2009

(54) METHOD AND SYSTEM FOR PRICING AND RISK ANALYSIS OF OPTIONS

(76) Inventors: Sergey P. Kolos, 777 Dunlavy St., #8208, Houston, TX (US) 77019; Konstantin A. Mardanov, 1401 Camp Craft Rd., #A, Austin, TX (US) 78746

(*) Notice: Subject to any disclaimer, the term of this patent is extended or adjusted under 35 U.S.C. 154(b) by 223 days.

(21) Appl. No.: 11/457,770

(22) Filed: Jul. 14, 2006

(65) Prior Publication Data

US 2007/0016503 A1   Jan. 18, 2007

Related U.S. Application Data

(60) Provisional application No. 60/699,760, filed on Jul. 16, 2005.

(51) Int. Cl.
*G06Q 40/00* (2006.01)
(52) U.S. Cl. .................................. 705/36 R; 705/37
(58) Field of Classification Search .................. 705/1, 705/36, 35, 10, 37, 76, 26; 702/139, 181; 364/554; 375/240; 707/3
See application file for complete search history.

(56) References Cited

U.S. PATENT DOCUMENTS

| | | | |
|---|---|---|---|
| 6,546,375 B1 | 4/2003 | Pang et al. | |
| 6,625,577 B1 | 9/2003 | Jameson | |
| 6,772,136 B2* | 8/2004 | Kant et al. | 706/50 |
| 7,349,878 B1* | 3/2008 | Makivic | 705/37 |
| 2002/0065755 A1 | 5/2002 | Shlafman et al. | |
| 2002/0103738 A1 | 8/2002 | Griebel et al. | |
| 2004/0215545 A1 | 10/2004 | Murakami et al. | |

* cited by examiner

*Primary Examiner*—James P Trammell
*Assistant Examiner*—John H Holly
(74) *Attorney, Agent, or Firm*—Schubert Osterrieder & Nickelson PLLC

(57) ABSTRACT

Methods and arrangements to determine a value of an option dependent upon a stochastic variable are contemplated. One embodiment provides a method to determine a value of an option dependent upon a stochastic variable. The method may involve receiving a specification of permissible error for the determination and an error weight function, apportioning a permissible error among multiple time periods, and evolving the error weight function. The method may also include determining a value of the option at the time periods with the determination of a value for one or more times periods within the permissible error apportioned for the one or more time periods. The method may also include determining the value of the option, responsive to the determination of the values of the option at the plurality of time periods. In some embodiments, the stochastic variable may represent the price of one or more financial instruments.

23 Claims, 8 Drawing Sheets

METHOD AND SYSTEM FOR PRICING AND RISK ANALYSIS OF OPTIONS

FIELD

The present invention is in the field of pricing and risk analysis. More particularly, the present invention relates to methods and arrangements to determine the value of an option dependent upon a stochastic variable or variables.

BACKGROUND

The pricing of an option is a fundamental problem of significant practical importance in today's markets. A wide and growing range of different types of options is available in financial markets around the world. An option is a type of derivative contract whose payoff is derived from the performance of the underlying. An option gives its holder the right but not the obligation to exercise a feature of the contract. For example, an option may provide rights to payments if a temperature in a region reaches a certain level by a certain date. This example option may provide insurance against bad weather. The underlying typically comprises an asset, such as a share, collection of shares or bonds traded on a public market. There are also derivatives based on other assets or instruments, such as commodities, currency values, share price indices and even other derivatives.

The simplest type of a derivative is known as a European "vanilla" option. It gives the buyer the right to buy (call) or sell (put) the underlying asset at a certain fixed time in the future at a given exercise price. American options allow the buyer to buy or sell the asset at the specified price at any time in the future, up to a certain fixed time limit.

While traditional European and American vanilla options specify a fixed exercise price and conditions, path-dependent options have variable exercise prices and conditions, which depend on the behavior of the underlying asset over time. Such options are called exotic. In Asian options, for example, the exercise price is based on an average price of the underlying asset, taken over a certain period prior to exercise. Another example of a path-dependent option is the barrier option, which becomes exercisable only when the price of the underlying instrument rises above or falls below a given threshold.

The challenge for the trader in options and other derivatives is to determine, based on the price and expected behavior of the underlying asset or assets, a price of the derivative justified by the profit that is likely to be made from its future exercise and the potential risk. The challenge is especially difficult at the initial issuance of the derivative. The issuer and potential initial purchaser must determine an accurate price without the benefit of significant data from the market in the derivative.

Even the simplest vanilla options pose a substantial challenge to the derivatives trader, because of the volatile nature of share price values in the stock markets. In deciding whether and when to buy, sell or exercise a given derivative, the trader must assess the factors driving the price of the underlying instrument and the likely variability of the price. These assessments must be factored into a model that can form the basis of a trading strategy that maximizes the profitability of the investment. Models used for this purpose typically view the asset price as a stochastic (random) process.

Various methods are known in the art for determining the stochastic behavior of a process over time, based on a trend function and a variance function. In some simple cases, where the behavior of the underlying asset S can be treated as a scalar log-normal process, Black and Scholes showed how to derive a differential equation whose solution provides the price of a derivative contingent on S. There are many derivatives, however, to which the Black-Scholes analysis is not applicable, such as path-dependent and other exotic options and, more generally, processes that cannot be properly modeled as log-normal. For these more complex analyses, a number of alternatives are known in the art.

Monte Carlo methods can be used to simulate the behavior of the underlying asset and/or derivative over time. Such simulation becomes extremely computation-intensive, however, when high accuracy is required, and small values of the time step must be used. Furthermore, Monte Carlo methods may not work well for pricing American-style path-dependent options. In addition, the use of Monte Carlo methods for actual quantification of risk may be impractical as it may require prices of all derivatives for all levels of the underlying and for all maturities.

Numerical solutions of partial differential equations can be used to evaluate some types of derivatives. These methods, however, are very sensitive to choice of boundary conditions and are likewise demanding of computation resources in multi-dimensional problems. In these problems, the option is dependent upon multiple variables rather than a single variable. One example is a basket option, an option dependent upon the value of a number of stocks or other financial instruments. Similarly, while binomial and trinomial trees are useful, particularly in some path-dependent assessments, they are limited in their ability to deal with multi-dimensional problems. For example, the pricing of basket options with these methods may require a great many nodes of the tree to be evaluated in order to achieve high accuracy.

Dynamic programming techniques provide a method of solving certain types of problems. These techniques may solve a problem by dividing the problem into subproblems and solving the subproblems. The problems may involve variables dependent upon a state. The variables may be indexed; for example, by time period. A simple example of dynamic programming is the determination of the Fibonacci sequence, where $F(n+2)=F(n+1)+F(n)$ and $F(0)=F(1)=1$. Thus, the problem of determining a value of the sequence for an index decomposes into determining the value of the sequence for two smaller indexed terms. The application of dynamic programming techniques to the valuation of options may have been very limited. The application may be heavily computation-intensive and may not produce estimates of error.

SUMMARY OF THE INVENTION

The problems identified above are in large part addressed by methods and arrangements to determine a value of an option which is dependent upon a stochastic variable. One embodiment provides a method to determine a value of an option which is dependent upon a stochastic variable. The method may involve receiving a specification of permissible error for the determination which includes an error weight function, apportioning the specification of permissible error among multiple time periods, evolving the error weight function through the time periods, and determining distributions of the stochastic variable for the time periods. The method may also include determining a value of the option at the time periods with the determination of a value for one or more of the time periods within the permissible error apportioned for the time period or time periods. The method may also include determining the value of the option, responsive to the determination of the values of the option at the plurality of time periods and storing the value of the option in a buffer.

BRIEF DESCRIPTION OF THE DRAWINGS

Aspects of the invention will become apparent upon reading the following detailed description and upon reference to the accompanying drawings in which like references may indicate similar elements.

DETAILED DESCRIPTION OF EMBODIMENTS

The following is a detailed description of embodiments of the invention depicted in the accompanying drawings. The embodiments are in such detail as to clearly communicate the invention. However, the amount of detail offered is not intended to limit the anticipated variations of embodiments; but on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Generally speaking, methods and arrangements to determine a value of an option which is dependent upon a stochastic variable are contemplated. Embodiments include processors, state machines, code, transformations, or other logic to determine a value of an option which is dependent upon a value of a stochastic variable by receiving a specification of permissible error for the determination and an error weight function, apportioning the specification of permissible error among multiple time periods, and evolving the error weight function. The embodiments may also include determining a value of the option at the multiple time periods with the determination of a value for one or more of the time periods within the permissible error apportioned for the time period. The embodiments may also include determining the value of the option, responsive to the determination of the values of the option at the plurality of time periods, and storing the value of the option in a buffer. In some embodiments, the stochastic variable may represent the price of one or more financial instruments and the option may constitute a financial derivative based on the one or more underlyings. In many embodiments, the determination may be provided by a service. In alternative embodiments, the determination may be embodied in a stand-alone program.

While specific embodiments will be described below with reference to particular circuit or logic configurations, those of skill in the art will realize that embodiments of the present invention may advantageously be implemented with other substantially equivalent configurations.

Figure 1:
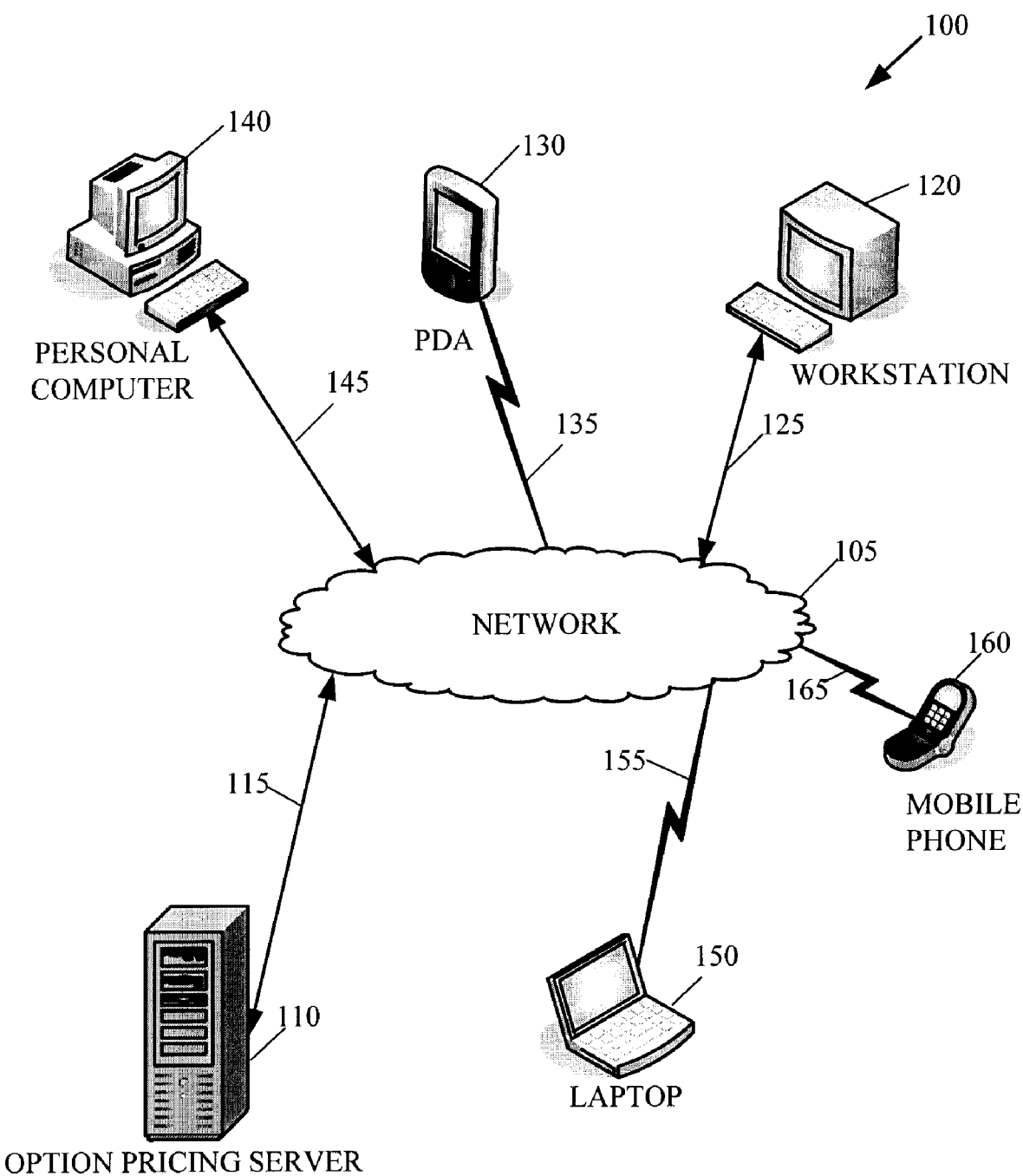
FIG. 1 depicts a network diagram of an embodiment of devices capable of determining the value of an option by apportioning a specification of permissible error for the determination over a plurality of time periods.

FIG. 1 depicts a diagram of an embodiment of a networked system 100 of devices capable of determining the value of an option. The system 100 includes a network 105, option pricing server 110 connected to network 105 through wireline connection 115, and a variety of devices capable of providing specifications of an option to option pricing server 110 and receiving the price of an option (option price receivers), including:

workstation 120, a computer coupled to network 105 through wireline connection 125, personal digital assistant (PDA) 130, coupled to network 105 through wireless connection 135, personal computer 140, coupled to network 105 through wireline connection 145, laptop computer 150, coupled to network 105 through wireless connection 155; and mobile phone 160, coupled to network 105 through wireless connection 165.

Network 105, which may consist of the Internet or another wide area network, a local area network, or a combination of networks, may provide data communications among the option pricing server 110 and the option price receivers 120, 130, 140, 150, and 160. Option pricing server 110 may determine option prices by running software installed upon it. Option pricing server 110 may receive specifications of the behavior of the stochastic (random) variable on which the options depends, of the nature of the option, a desired range of accuracy, and an error weighting function from the option price receivers 120, 130, 140, 150, and 160. Option pricing server 110 may determine the option price by apportioning a specification of permissible error for the determination over a plurality of the time periods, evolving the error weight function through the plurality of time periods, and determining distributions of the stochastic variable at the plurality of time periods. Option pricing server 110 may also determine a value of the option at the plurality of time periods, where at least one determination of value for a time period is within the permissible error apportioned for the time period. Option pricing server 110 may also determine the value of the option, responsive to the determination of the values of the option at the time periods. Option pricing server 110 may transmit the results of the determinations of option values over network 105 to the option price receivers 120, 130, 140, 150, and 160. The reports may be in the form of graphs, tables, spreadsheets, or other types of data records.

The arrangement of the option pricing server 110 and other devices making up the exemplary system illustrated in FIG. 1 is for explanation, not for limitation. In other embodiments, some of the devices 120, 130, 140, 150, and 160 may gather data, such as data about stock prices, and transmit the data to option pricing server 110 for the determination of the values of options. Some of the data may represent parameters in models used to specify the behavior of the stochastic variable. The data may enabled option pricing server 110 to update previously determined values, to determine additional values for which data was previously lacking, or to determine updated or additional figures on the volatility of options. The option pricing server 110 may automatically receive or retrieve the data, may update the values of options, may store the values, and may produce a graph or other reports showing the change in values of the options over time.

Data processing systems in some embodiments of the present invention may omit a server. In some embodiments, software on an option price receiver may determine an option price without communicating with a server. In alternative embodiments, hardware may perform determinations to determine the value of options. Similarly, data processing systems in a few embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
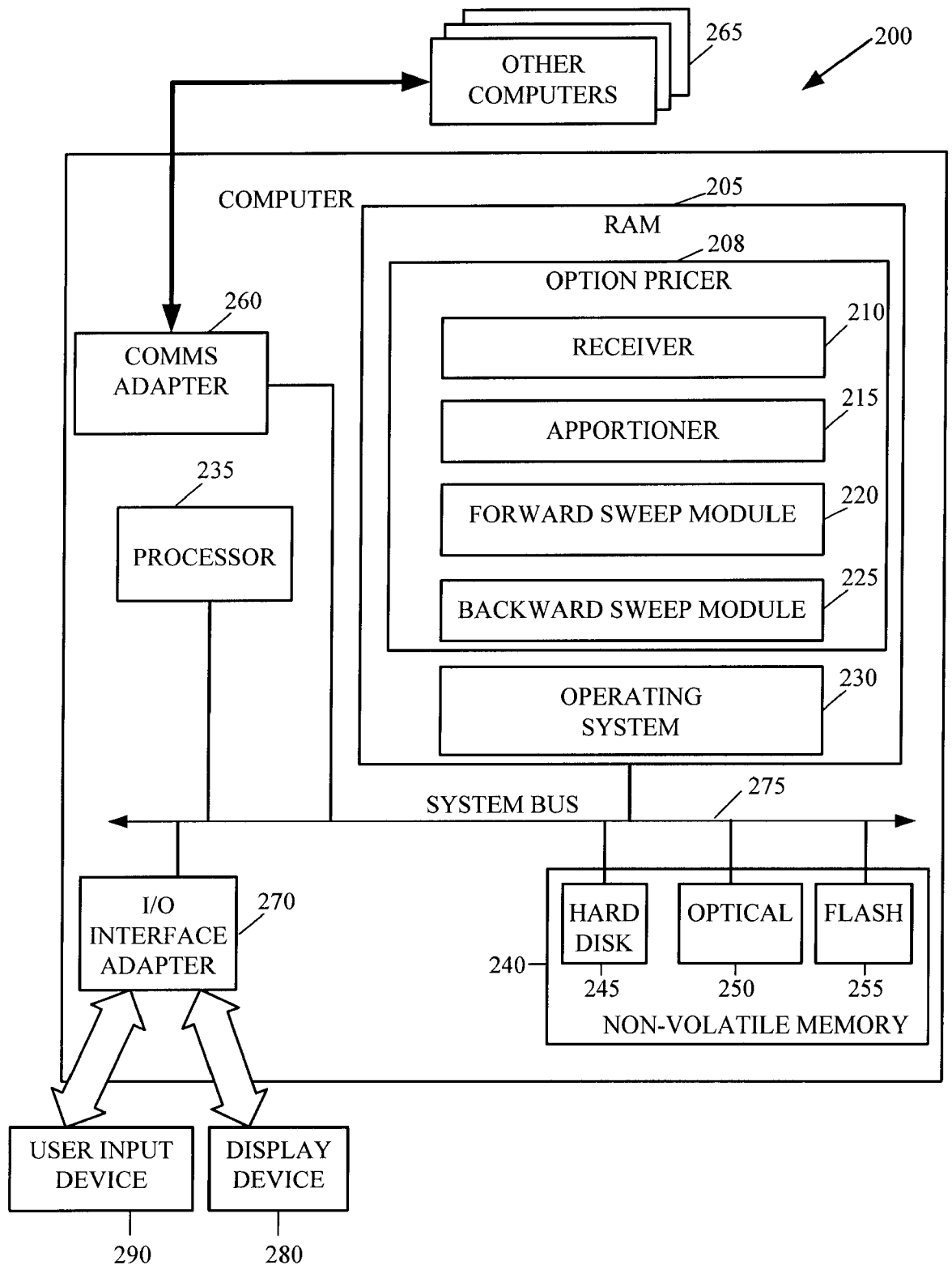
FIG. 2 depicts an embodiment of a computer to determine the value of an option by apportioning a specification of permissible error for the determination over a plurality of time periods.

Turning to FIG. 2, depicted is an embodiment of a computer 200 capable of determining the value of an option by apportioning a specification of permissible error for the determination over a plurality of time periods that includes random access memory (RAM) 205, a processor 235 or CPU, non-volatile memory 240, a communications adapter 260, and an Input/Output (I/O) interface adapter 270 connected by system bus 275. Stored in RAM 205 are an option pricer 208 and an operating system 230. Option pricer 208 may comprise computer program instructions for determining the value of an option by apportioning a specification of permissible error for the determination over a plurality of time periods. Option pricer 207 may include receiver 210 for receiving specifications of the option, apportioner 215 for apportioning a specification of permissible error, forward sweep module 220 for determining the distributions of a stochastic variable upon which the option is based at the plurality of time periods and evolving a error weight function over the plurality of time periods, and backward sweep module 225 for determining the value of the option at the time periods. Processor 235 may execute the instructions of option pricer 208 and store the results in memory, such as RAM 205 or non-volatile memory 240.

Operating system 230 may comprise UNIX™, Linux™, Microsoft Windows™, AIX™, IBM's i5/OS™, or other operating systems useful for determining the value of an option by apportioning a specification of permissible error for the determination over a plurality of time periods as will occur to those of skill in the art. Option pricer 208 and operating system 230 are shown in RAM 205 in FIG. 2, but many components of such software may be stored in non-volatile memory 240 also. Further, while the components of such are shown simultaneously present in RAM, in other embodiments, only some of the components of RAM 205 may be present at any given time.

Non-volatile computer memory 240 may be implemented as a hard disk drive 245, optical disk drive 250, electrically erasable programmable read-only memory space (EEPROM or Flash memory) 255, RAM drives (not shown), or as any other kind of computer memory as will occur to those of skill in the art. Communications adapter 260 may implement the hardware level of data communications through which one computer sends data communications to other computers, such as other computers 265, directly or through a network. Such data communications may be carried out through serially through RS-232 connections, through external buses such as USB, through data communications networks such as IP networks, and in other ways as will occur to those of skill in the art. Examples of communications adapters include modems for wired dial-up communications, Ethernet (IEEE 802.3) adapters for wired network communications, and 802.11b adapters for wireless network communications.

I/O interface adapter 270 implements user-oriented I/O through, for example, software drivers and computer hardware for controlling output to display devices such as display device 280 as well as user input from user input device 290. User input device 290 may include both a keyboard and a mouse. Some embodiments may include other user input devices such as speech interpreters, bar code scanners, text scanners, tablets, touch screens, and/or other forms of user input devices.

The computer and components illustrated in FIG. 2 are for explanation, not for limitation. In some other embodiments, embedded systems, PDAs, cell phones, and other network-enabled devices may determine option prices or may transmit specifications of options to servers or other devices and receive determined option prices from the servers or other network devices. In many other embodiments, the option pricer 208 or components may be implemented in hardware, firmware, or in state machines or may form a component of an operating system. In several other embodiments, the option pricer 208 may have more or less than four components. In a few other embodiments, option pricer 208 may be implemented as a special-purpose processor, special-purpose hardware, or other hardware implementation.

Figure 3:
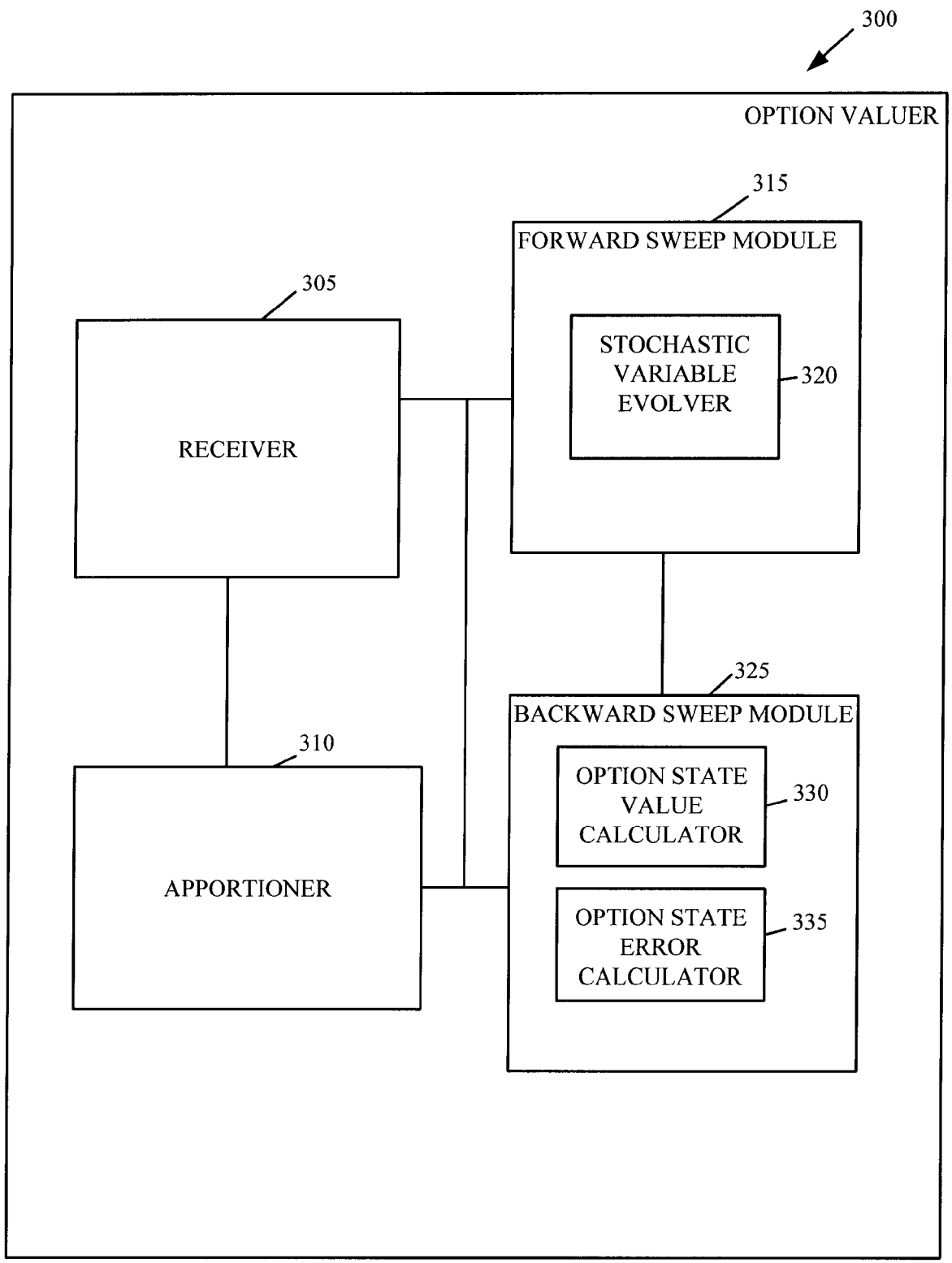
FIG. 3 depicts an embodiment of an option valuer.

Turning to FIG. 3, depicted is an embodiment of an option valuer 300 that includes a receiver 305, an apportioner 310, a forward sweep module 315, and a backward sweep module 325. An option may be a contract right dependent upon the value of a stochastic variable in the future. The stochastic variable is called the underlying. For example, an option may provide rights to payments if a temperature in a region reaches a certain level by a certain date. This example option may provide insurance against bad weather. In this example, the underlying is a measure of the temperature. The underlying or other variable may consist of a stochastic (random) variable which changes with respect to time. For example, an option may be based upon the value of stock, a quantity which may change over time. The time may be divided into slices or periods, and the variable may be indexed according to the time slice or period. More generally, a stochastic variable may be indexed in other ways. When the option is based upon stock or another financial instrument or instruments, the option may be called a derivative.

Receiver 305 may receive specifications about an option to be valued. The specifications may include a model of the underlying or other variable, a specification of how the value of the option depends upon the variable, an error-weighting function, a specification of acceptable error, and a specification of the time periods. The model of the variable may specify a probability distribution for values of the variable over different time periods. The specification of the dependence of the value of the option upon the variable may consist of a function. For example, the value of a call option for stock (option to purchase the stock) at the deadline for exercise is the value of the stock minus the exercise price. The value of a put option at the deadline for exercise is the exercise price less the value of the underlying stock. The weighting function provides weights for the values of the variable according to their importance in determining the value of the option.

Receiver 305 may be implemented in hardware or software. For example, a receiver on an option pricing server may consist of a network interface card, a USB port, or a terminal adapter on a PCI (peripheral component interconnect) card. A receiver on a self-contained option valuer may include the hardware involved in transmitting data, such as the hardware for a socket if separate programs produce the input specifications and do the determinations. Receiver 305 may receive the specifications in a variety of forms. The specifications may consist of functions, parameters of functions, or sets of data. The data may be placed in RAM, made available in a file, or placed on a storage medium such as a CD or a DVD.

Apportioner 310 divides the specified error among the various time periods. Suppose, for example, that stock is to be valued at ten time periods. Apportioner 310 may divide a total error of 10% of value into 10 errors of 1% at each time period. Forward sweep module 315 may evolve the error weighting function over the time periods and includes stochastic variable evolver 320. Stochastic variable evolver 320 may determine the distributions of the stochastic variable at the relevant time periods. For example, stochastic variable evolver 320 may make projections of the distribution of the value of stock forward over several time periods.

Backward sweep module 325 includes option value calculator 330 and option error calculator 335. Option value calculator 330 may determine values for an option at a time period based upon determined values for the underlying or other variable at the time period. The values for the underlying may be determined by stochastic variable evolver 320. Option error calculator 335 estimates an error in the determination. The estimation may be used to refine the determination to satisfy the specification of accuracy or to provide an indication of the risk of error. Option valuer 300 may determine the value of an option based upon the determined values at the time periods and the error estimates.

Option valuer 300 may store the results of the determination in a buffer, such as in RAM or non-volatile memory. Option valuer 300 may also report the results of the determination by displaying the results, printing the results, announcing the results through sound, generating an invoice, or sending the results to other programs, either on the same computer or to another computer over a network. The user may be able to control the form of the reporting of the results through a graphic user interface. The reports may be in the form of tables, graphs, equations, or other methods of presenting data as may be known to those of skill in the state of the art. For example, a graph may indicate the change in values of an option over time.

FIG. 3 is for illustration and not limitation. Other embodiments may comprise different modules with different submodules. The modules of FIG. 3 may be implemented in hardware or software or a combination. For example, option valuer 300 may be implemented as part of a computer such as computer 200 in FIG. 2, and may consist of software containing instructions to determine the values of options and hardware to execute the instructions.

Figure 4:
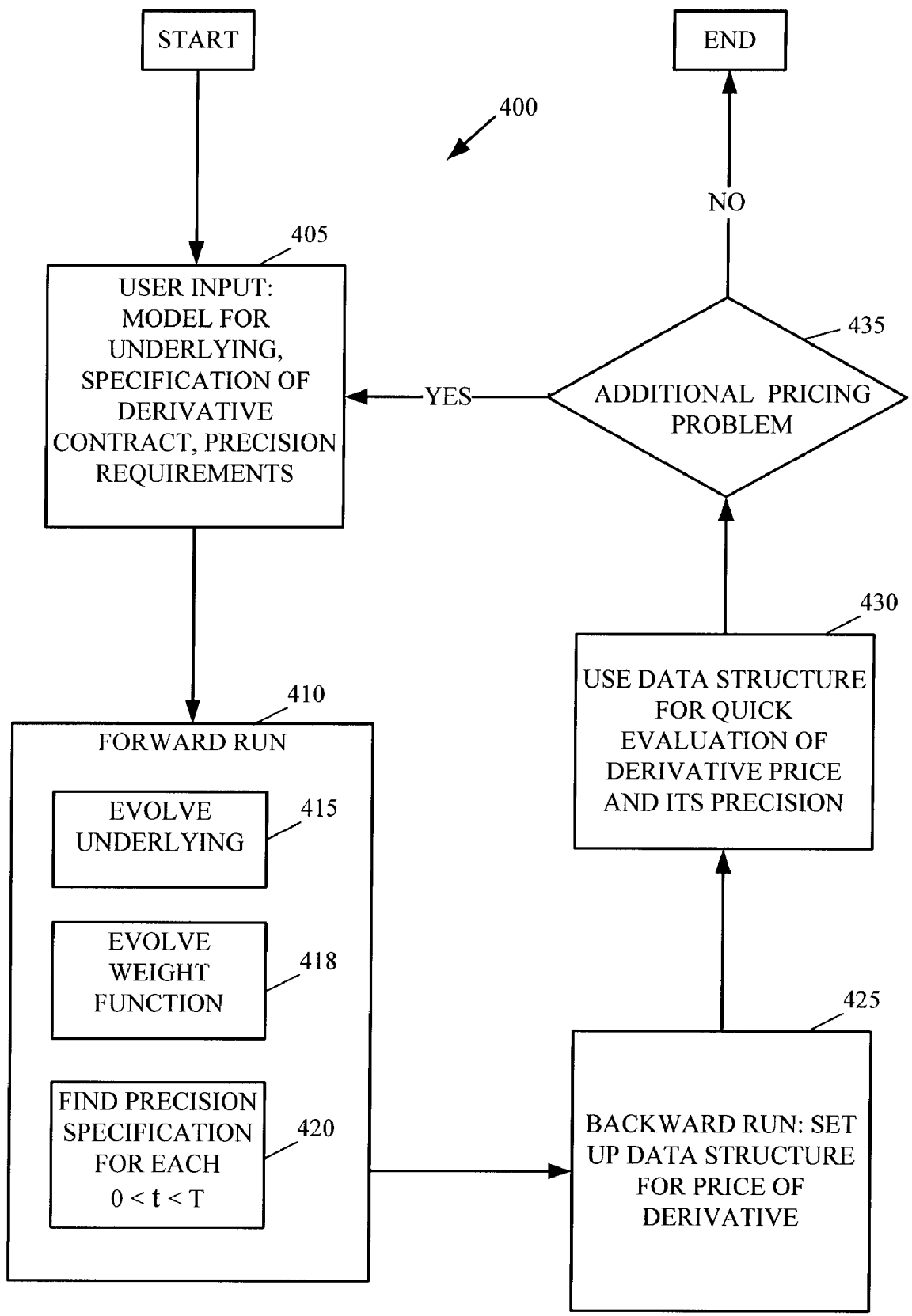
FIG. 4 depicts a flowchart of an embodiment to determine the value of an option by apportioning a specification of permissible error for the determination over a plurality of time periods.

FIG. 4 depicts a flowchart of an embodiment to determine the value of an option dependent upon a stochastic variable. In the discussion of FIG. 4, the variable will be referred to as the underlying. Flowchart 400 of FIG. 4 includes accepting input from a user (element 405). The input may include a model for an underlying, a specification of a derivative contract or other form of option, and precision requirements. Under standard analytic models for the pricing of a derivative, the value of an option may be expressed in terms of a model of the underlying and a specification of the derivative contract, as demonstrated by the following paragraphs.

The risk-neutral approach may be the de facto standard method to price financial derivatives. For any path-dependent European-type option the risk-neutral method states that under the equivalent risk-neutral probability measure the discounted value of the option is a martingale:

$$v_t(x_t) = E_t[e^{-r_t \Delta t} v_{t+1}(x_{t+1})],$$

where $v_t(x_t)$ is a value of the derivative at time t when the underlying is equal to $x_t$, the $t^{th}$ time interval is $\Delta t$, $r_t$ is the interest rate prevailing on the interval $\Delta t$, and the expectation is conditioned on the information available at time t.

For an American-type or exotic options the following approximate relation may be used:

$$v_t(x_t) = \phi_t(x_t, E_t[e^{-r_t \Delta t} v_{t+1}(x_{t+1})]),$$

where $\phi_t$ is a function which depends on a derivative. For example, for an American put we have $$\phi_t(x, y) = \max[(K - e^x) +, y],$$

where the + function indicates the maximum of the argument and 0, K is the exercise price, and x=ln s where s is the value of the underlying. In other words, the value of a put option at a state may be the greater of the value of exercising it currently (the difference between price paid upon exercise and the value of the underlying at exercise) and the expected value of the option in the future.

The evolution of state of the underlying may be expressed as $$x_{t+1} = \chi_t(x_t, \epsilon_t), \tag{0}$$

where $\epsilon_t$ is a noise process with a distribution density $p_t(\epsilon_t)$. The state evolution function may describe how the probability distribution representing possible values of the underlying may change with time. The state evolution function depends upon a noise or error process, which may describe the uncertainty in the prediction of the value of the derivative. Then $$v_t(x) = \varphi_t\left(x, \int dp_t(\varepsilon) e^{-r_t \Delta t} v_{t+1}(x_t(x, \varepsilon))\right) \tag{1}$$

This is a very general formula for valuation of financial derivatives. Under this model, the value of an option may be determined according to expression (1) using as an input from user only functions $\chi_t(.)$ (state evolution function), $p_t(.)$ (probability density), and $\phi_t(.)$ (option value specification).

The precision requirements provided in the input in element 405 may include a specification of the overall permissible error in the estimate of the value of the option and a weighting function $\psi(.)$ which measures the importance of accuracy over the values of the underlying. The pre-specified error may then be defined as:

$$\text{error} = \int d\psi(x) |\delta_0(x)|, \tag{2}$$

where $\delta_0(x)$ is an error of $v_0(x)$:

$$v_0(x) = \hat{v}_0(x) + \delta_0(x),$$

with $\hat{v}_0(x)$ denoting the determined value. To provide precision requirements, the user may specify a permissible amount of error and a precision weight function $\psi(.)$. The functions representing a model of the underlying, the description of the option and the weight for the error may be coded by the user on a computer with a programming language that conforms to the system interface or may be selected from the functions coded in advance by a system implementer.

The method of flowchart 400 also includes performing a forward run to project values over time periods until the expiration of the option (element 410). The time periods may specify the intervals at which the determinations are made; for example, weekly, daily, or hourly. They may be specified by a user or determined by a program. The projections include evolving the underlying (element 415), evolving the weight functions (element 418) and finding a precision specification for each time period, 0<t<T, where T is the time period at which the option expires (element 420). Evolving the underlying (element 415) may be accomplished by applying formula (0), and may produce distributions of values for the underlying at the time periods.

The evolution of the weight functions (418) may also be described by a formula. It can be shown that for sufficiently regular functions $\phi_t(x, y)$ the computation error (2) is less than or equal to the sum of computational errors at each time period:

$$\text{error} \leq \int dx \psi(x)|\overline{\delta_0}(x)| + \int dx \psi_1(x)|\overline{\delta_1}(x)| + \ldots + \int dx \psi_{T-1}(x)|\overline{\delta_{T-1}}(x)| \quad (3)$$

where $\overline{\delta_0}(x)$ is an error produced by a numerical procedure:

$$\varphi_t\left(x, \int d\varepsilon p_t(\varepsilon) \hat{v}_{t+1}(x_t(x, \varepsilon))\right) = \hat{v}_t(x) + \overline{\delta_t}(x) \quad (4)$$

and $\psi_t(x)$ is a weight function for time period t. This function is such that for any sufficiently regular $f(x)$ the following identity holds:

$$\int d\psi_t(x) \int d\varepsilon p_t(\varepsilon) f(x_t(x, \varepsilon)) = \int d\psi_{t+1}(x) f(x). \quad (5)$$

Since the total error of computation may be expressed as a sum of the local time-slice errors, the numerical implementation of (1) may be optimized at each time-slice independently of the other time periods.

The evolution of the weight function (418) may start at time t=0 when the precision weight is known since $\psi_0(x)=\psi(x)$. Then, having a weight function for time=t, a weight function at time t+1 may be computed through the function found for time t and functions that specify the model for the underlying ($\chi t (x, \epsilon)$, pt ($\epsilon$)) according to expression (5).

Finding a precision specification for each time period 0<t<T (element 420) may involve dividing the space of possible values of the underlying into subelements with sufficiently bunched points to produce an accurate estimate. The space representing values of the underlying may be multi-dimensional. The underlying may include multiple assets, and the dimension of the space representing values of the underlying may equal the number of assets. For example, a basket option may depend upon the average price of a basket of assets.

Figure 5:
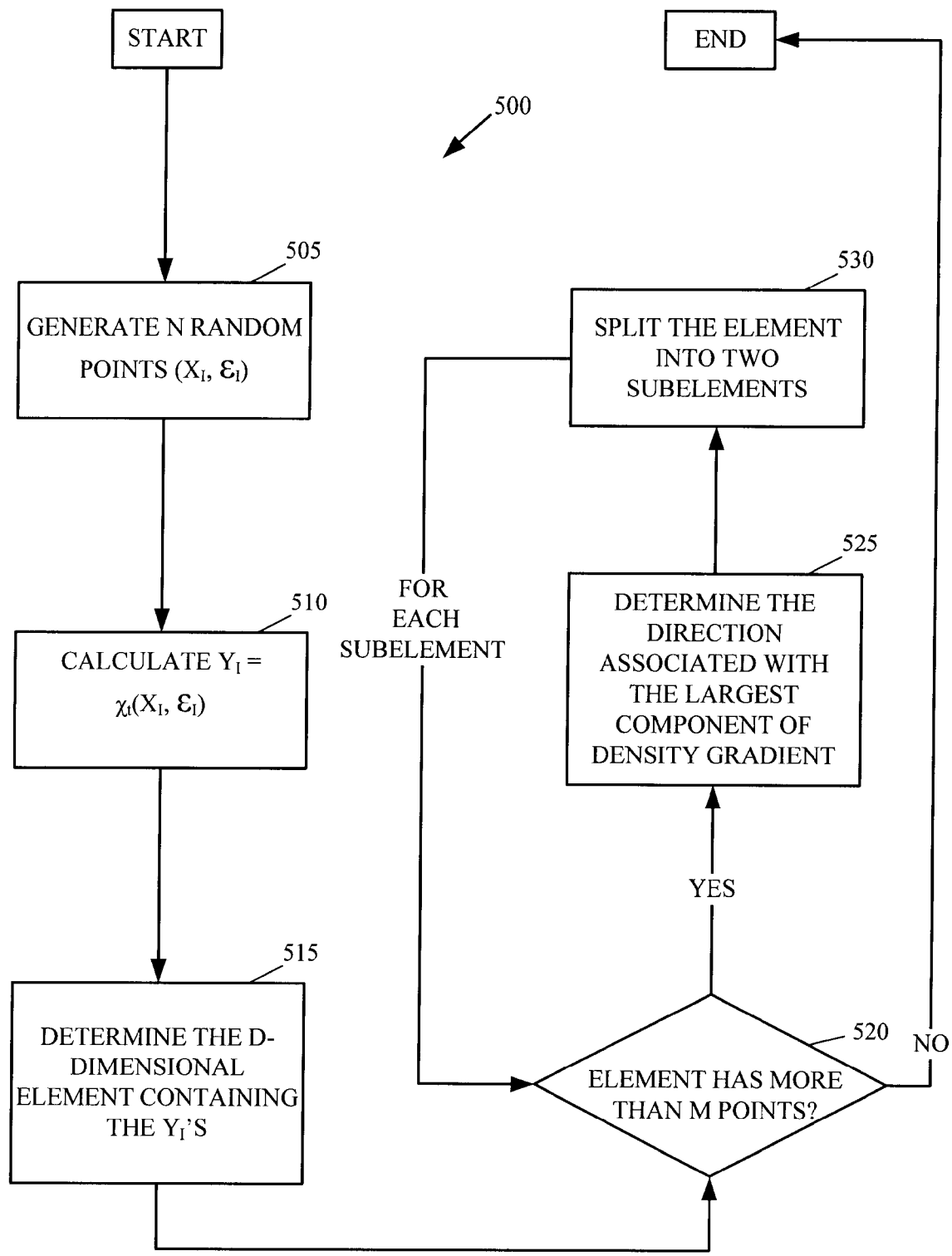
FIG. 5 depicts a flowchart of an embodiment to find precision specifications.

Turning now to FIG. 5, shown is a flowchart of an embodiment to find precision specifications. Flowchart 500 begins with generating N random points $(x_i, \epsilon_i)$ with the distribution density $\psi_t (x) p(\epsilon)$. (element 505). The random points may represent values of the underlying and values of the noise process. The points may be generated by a purely random number generator or a quasi random number generator. The evolution function $\chi_t$ is then applied to produce the N points $$y_i = \chi_t(x_i, \epsilon_i) \text{ (element 510).}$$

The values $y_i$ may represent points in a d-dimensional space, where d is the number of assets comprising the underlying.

A d-dimensional rectangle in the space of underlying is set up so that it contains all the values $y_i$ (element 515). A recursive procedure then starts with checking if the number of points in the element is greater than a pre-specified number, (element 520). If yes, the recursion may continue by determining the direction associated with the largest component of density gradient (element 525). For example, the density gradient along each coordinate direction may be examined. The recursive procedure may also include splitting the element in halves in the chosen direction (element 530). For each of the two subelements thus obtained, the method of flowchart 500 returns to element 520.

If a subelement has no more than m points, the processing of the subelement may end at element 520. Once there are no subelements with more than m points, the approximate value of function $\psi_{t+1}$ for an input x can be found as $$\psi_{t+1}(x) = \frac{1}{N} \frac{n_j}{V_j},$$

where x falls into j'th element which contains $n_j$ points $y_i$ and has volume $V_j$. The finding of precision specifications may end.

Figure 6:
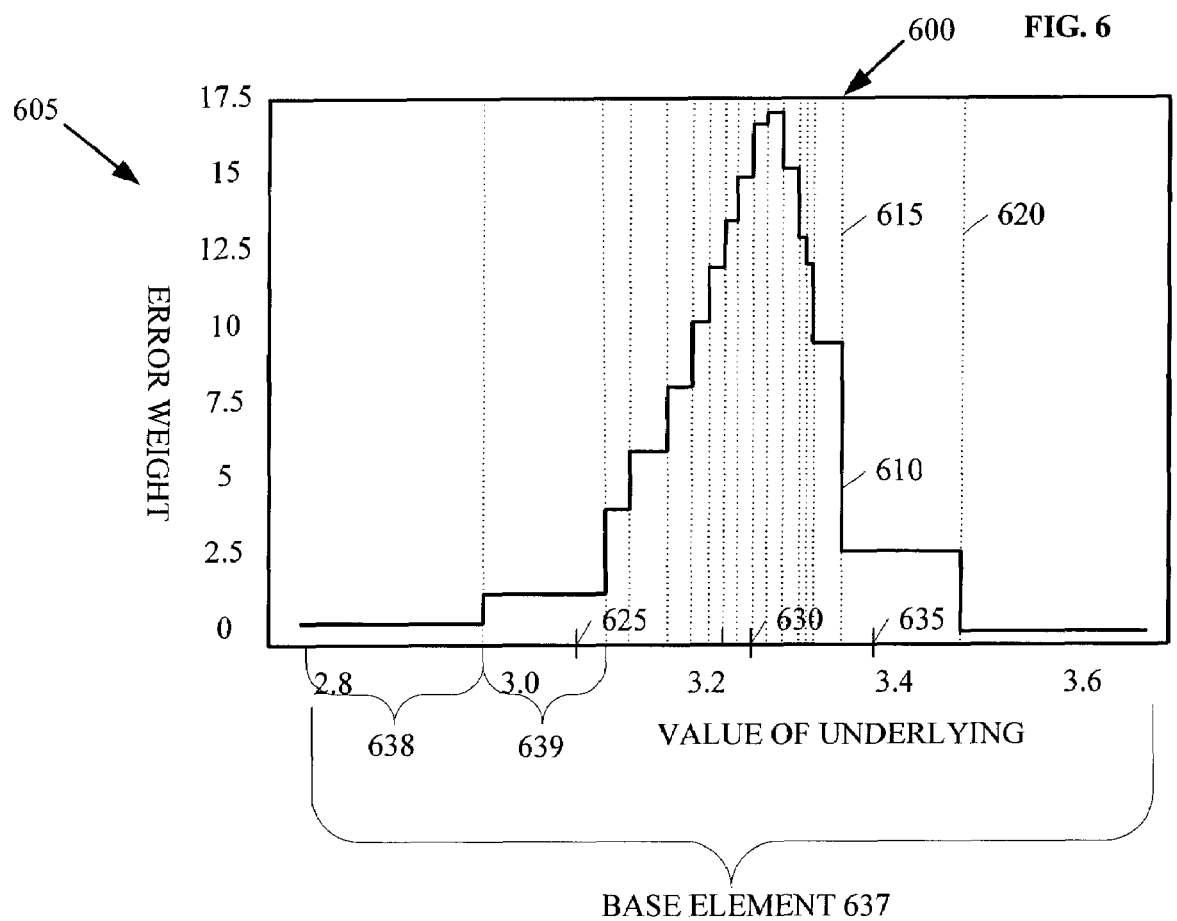
FIG. 6 depicts an exemplary diagram of an evolution of a precision weighting function.
Figure 6:
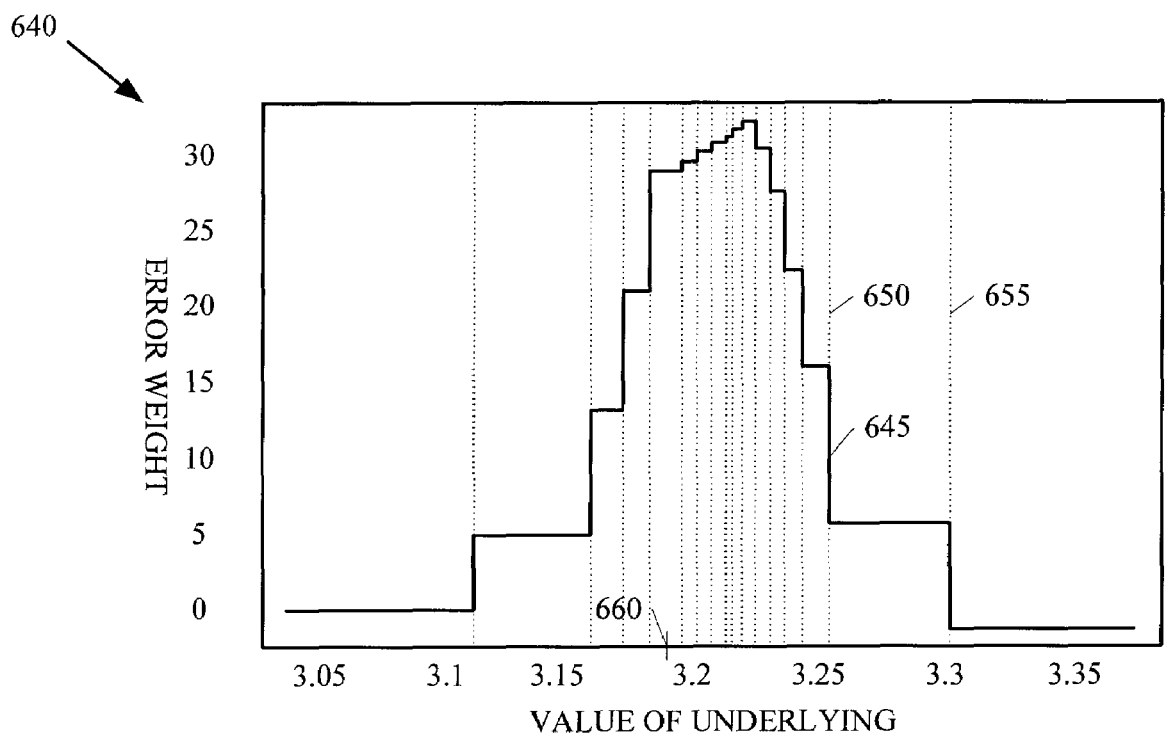

Turning now to FIG. 6, shown is an exemplary diagram 600 of the evolution of a weight function as may occur under the method of FIG. 5. Diagram 600 includes graph 605 showing error weight versus value of underlying at a successor time period and graph 640 showing error weight versus value of underlying at a predecessor time period. The weight functions plotted in graphs 605 and 640 indicate for each value of the underlying the weight to be assigned in measuring error. In the exemplary diagram 600, the example graphs 605 and 640 are piece-wise constant. The values of underlying are divided into subintervals, on each of which the weights for the values of underlying are constant. The subintervals may correspond to the subelements produced by the method of FIG. 5.

Graph 640 includes weight function 645 and point 660, a value of underlying. In graph 640, the value of underlying ranges from 3.05 to approximately 3.35, and the weights range from 0 to approximately 30. The weight function 645 assigns relatively large weights to values of underlying between 3.15 and 3.25, and relatively small weights to other values. For example, the weight assigned to values around 3.2 is around 30, and the weight assigned to values less than 3.1 and greater than 3.3 is 0. This weight function may be suitable for an option in which a value of underlying around 3.2 is critical.

Graph 605 includes evolved weight function 610 and successor points 625, 630, and 635. The successor points 625, 630, and 635 represent possible evolutions of points 660 after application of a formula such as formula (0). If the underlying has value indicated by point 660 at the time period represented by graph 640, then the underlying may have any of the values 625, 630, and 635 at the time period represented by graph 605, as well as other values. As a result, in this example, the points 625, 630, and 635 receive significant weights, because they may represent an evolution of a point with a relatively high error weight. Of these points, points 625 and 635 have values of underlying outside the area of heavy concentration of weights in graph 640, the area for values between 3.15 and 3.25. Conversely, some of the points in graph 605 with values of underlying between 3.15 and 3.25 may receive relatively small weights, because they may represent the evolution of points in graph 640 outside the range of 3.15 to 3.25.

Accordingly, the evolved weight function 610 is more spread out than the weight function 645. A wider range of underlying receives non-zero weights, and the weights tend to be smaller than the non-zero weights of graph 640. The highest weight assigned by the weight function 610 is approximately 17, compared to the weight of 30 assigned by the weight function 645. In addition, the range of underlying assigned non-zero weights extends from approximately 3.0 to 3.45. In contrast, the range in graph 640 was 3.1 to 3.3. Further, the range of underlying receiving the heaviest weights in graph 605 range from approximately 3.15 to 3.35, in contrast to the range of 3.15 to 3.25.

FIG. 6 also illustrates the subdivision of a one-dimensional base element to find precision specifications at a time slice according to the method of FIG. 5. Base element 637 represents the one-dimensional element containing the generated values of underlying in graph 605. In the illustration of FIG. 6, the values of the underlying are numbers. In other cases, the element may be multi-dimensional. The underlying may represent multiple financial instruments, and the value may be a vector.

In the example of FIG. 6, many more points may have been generated than a pre-specified number m. As a result, the base element 637 and the corresponding base element in graph 640 may be subdivided into subelements each containing fewer than m points. Subelements are represented on graph 600 as intervals such as intervals 638 and 639 contained between dotted lines. The dotted lines, such as dotted lines 615, 620, 650, and 655, represent points of division of the base elements. In example graph 600, the divisions are not of equal size. Some regions of graphs 605 and 640 may contain more points than others, as illustrated by the higher probability values for some ranges of values of underlying.

Returning to FIG. 4, the method of flowchart 400 may include performing a backward run to create a data structure for the price of the derivative $\hat{v}_t$ that enables one to quickly find price of the derivative for any valid x and 0<t<T (element 425). Since the option contract terminates at time t=T, the option contract may have zero value at T+1. Thus, $\hat{v}_{T+1}(x)=0$. The expression (1) may then used to compute $\hat{v}_t$ by starting from t=T and stepping backwards until t=0. In addition, a portion of the total permissible error specified as part of the input (element 405) may be apportioned to each time period. At each time period, the minimal number of determinations may be performed to reduce the error for the stage as measured by the precision weighting function $\psi_t(x)$ to no more than the permissible error apportioned to the time period.

Figure 7:
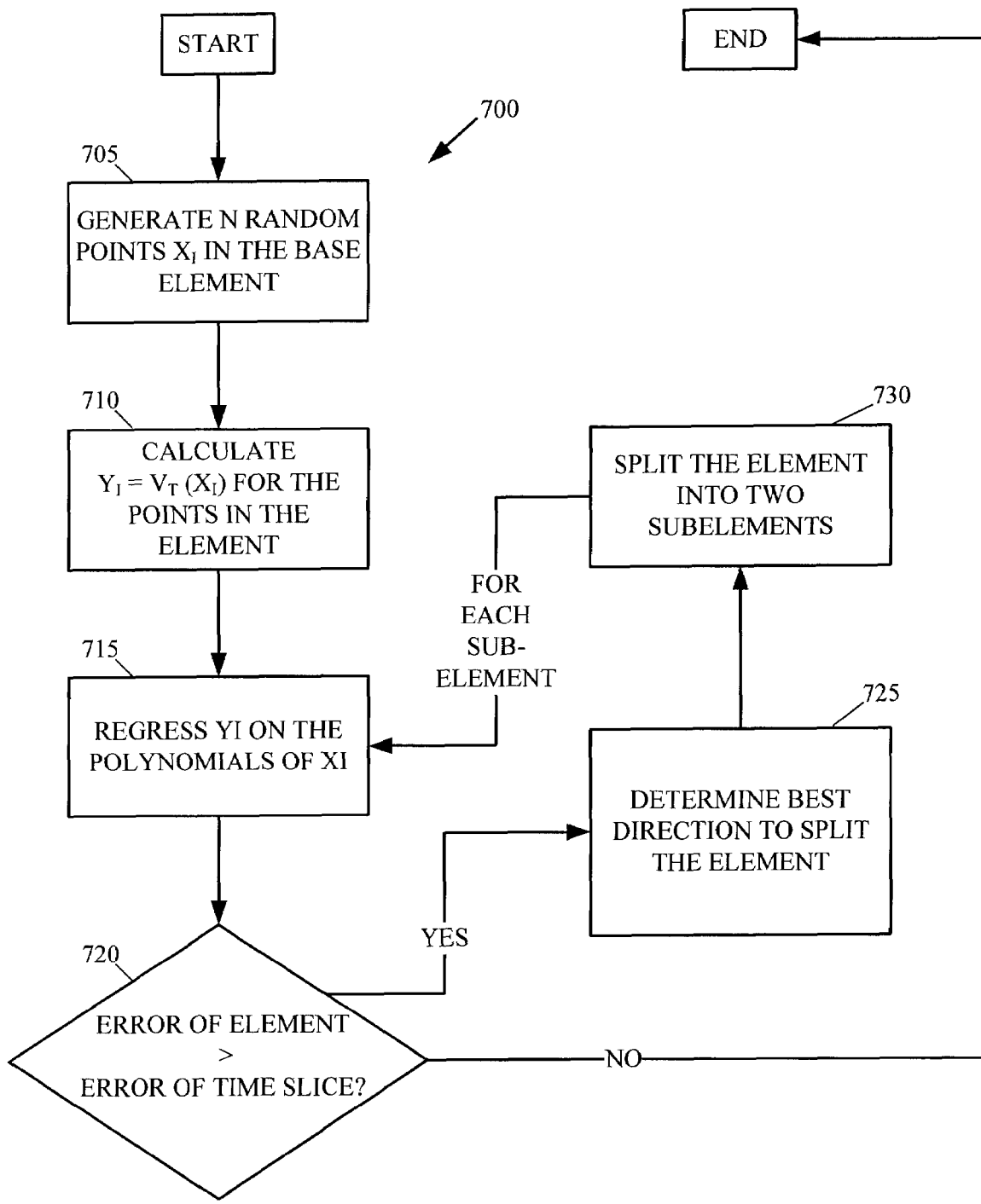
FIG. 7 depicts a flowchart of an embodiment to subdivide a base element to reduce errors in determining option values at a time period.

Turning now to FIG. 7, shown is a flowchart 700 of one possible implementation of the determinations of the backward run in element (425). The procedure of flowchart 700 may begin with the generation of N random or quasi-random points $x_i$ distributed in an element, initially the base element (element 705). The points may be distributed uniformly. The base element is the d-dimensional rectangle where the precision weight function $\psi t(x)$ is significant. The procedure may also include determining the values $y_i=\hat{v}_t(x_i)$ for each point (element 710). The determination may use formula (4) above.

The integral in formula (4) may be computed using any of Gaussian integration, Monte Carlo techniques, quasi-Monte Carlo techniques, adaptive integration methods, or other techniques which may be known to those of skill in the art.

A recursive procedure may begin by performing regression of the points $y_i$ on polynomials or other basis functions of components of the $x_i$ (element 715). The resulting coefficients and basis functions define the approximation $\hat{v}_t$ on the element. The error of approximation is given by the average of the regression residuals. This error is compared to the permissible error apportioned to the time-slice t (element 720). If the precision is sufficient, setting up the data structures $\hat{v}_t$ may end.

Otherwise, the recursive procedure may include determining the best direction to split the element (element 725). The best direction may be determined by comparing how the total error of approximation decreases when the element is split in different directions. For ease of determination, the directions may be limited to coordinate planes of the d-dimensional rectangle. For example, in a two-dimensional rectangle, the directions may correspond to lines parallel to the x and y axes. The recursive procedure may also include splitting the element under consideration into two or more subelements along the best direction (element 730). For each subelement, the method of flowchart 700 proceeds with recursion by regressing the values in the element against basis functions of the $x_i$ (element 715).

Figure 8:
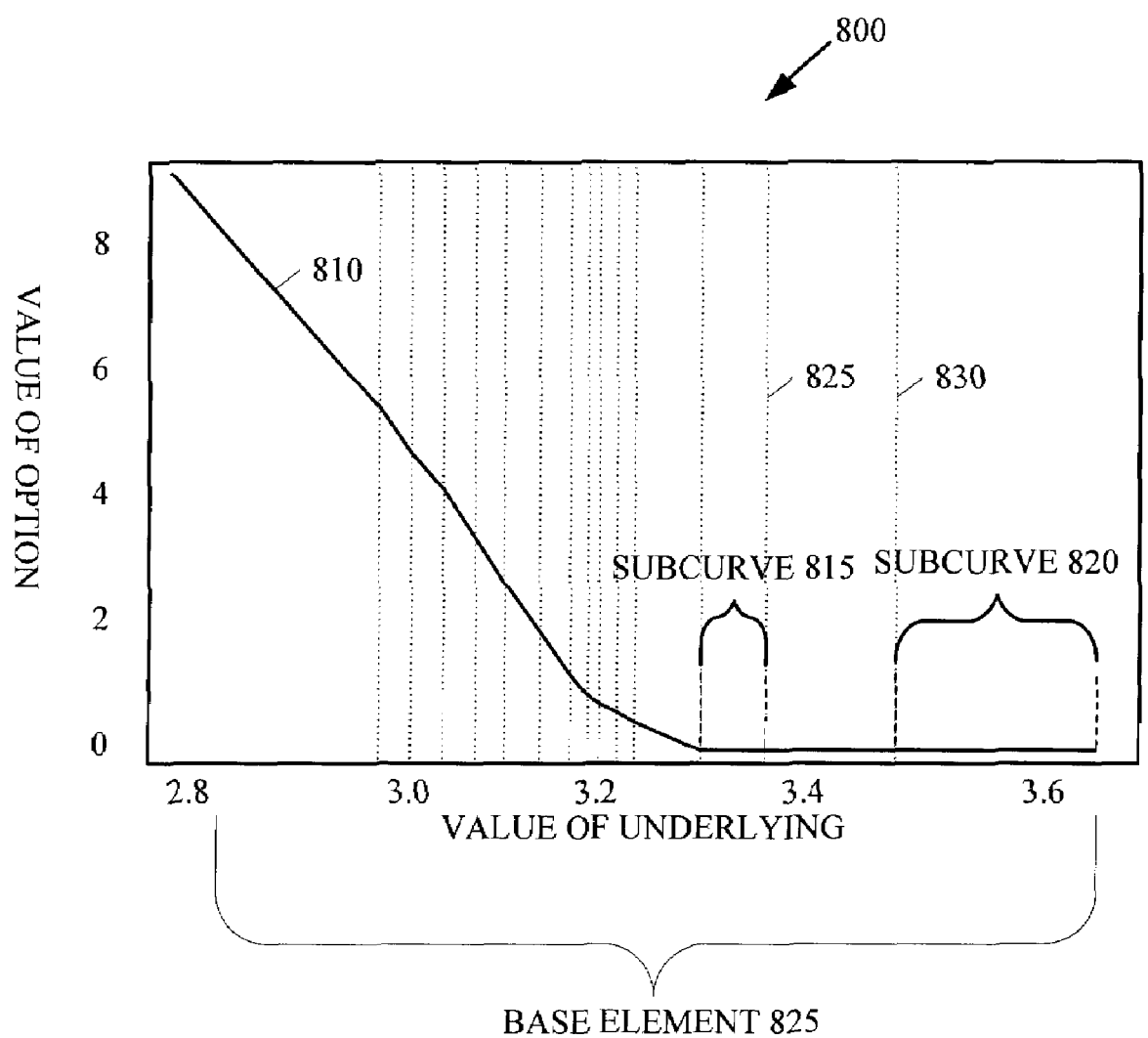
FIG. 8 depicts an exemplary graph of the subdivision of a base element to reduce errors in determining option values at a time period.

Turning to FIG. 8, illustrated is graph 800 of an exemplary decomposition of the base element to reduce error in the determination of the value of the option at a time period. Graph 800 plots the value of an option against the value of an underlying at some time. Graph 800 includes the curve 810 showing the option values for values of the underlying and base element 825. The curve 810 is divided into sub curves, such as sub curves 815 and 820. The base element 825 may correspond to the values of the underlying where the precision weight function is significant.

The regression of the option values shown in graph 800 against polynomials or other basis functions in values of the underlying may produce a larger error than desired, because the curve 810 may not correspond closely to such a function in the values of the underlying. The procedure of FIG. 7 may therefore be applied to subdivide the base element 825. The dotted vertical lines such as vertical lines 825 and 830 represent points of division of the base element 825. After the division of the base element, regressing option values against basis functions in values on the underlying over subelements of the base element may produce a smaller error. The regression of the option values represented by sub curves 815 and 820 and the other sub curves of curve 810 separately against basis functions in the underlying may produce smaller overall error than regressing the entire curve 810.

Returning to FIG. 4, the procedure may include using the computed data structure for $\hat{v}_t(x)$ for quick evaluation of derivative price and its precision (element 430). The data structure is accessed through functions implemented in the system. In particular, since single run of the system allows one to quickly find the value of the derivative at any x and t, this method is very well suited for risk analysis using Monte Carlo procedure. In this procedure the paths of underlying are generated and the value of the derivative is then evaluated at each time step for each path. This analysis can be performed by external systems via repeated calls to the evaluation function of this system. Alternatively, the Monte Carlo procedure can be implemented within the system. If there are additional option pricing problems (element 435), the elements from 405 to 430 may be repeated. Otherwise, the pricing of options may end.

Some embodiments of the invention may provide one or more of the following advantages:
  pricing financial derivatives in a robust way without the user having to choose parameters,
  pricing financial derivatives in a unified way so that the user can easily adjust to a given specification,
  pricing financial derivatives simultaneously for a range of values of underlying so that the result is readily available for risk analysis,
  producing a price along with its error estimate for any value of underlying within a valid range, and
  finding prices of financial derivatives with a prespecified precision in minimal computational time.

Some embodiments of the invention may be superior to prior art in one or more of the following aspects:
  easier to use,
  more versatile,
  more efficient,
  more efficient in high dimensions,
  more robust, and
  better suited to requirements of risk analysis.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product for determining the value of an option accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

It will be apparent to those skilled in the art having the benefit of this disclosure that the present invention contemplates methods and arrangements to determine a value of an option which is dependent upon a stochastic variable. It is understood that the form of the invention shown and described in the detailed description and the drawings are to be taken merely as examples. It is intended that the following claims be interpreted broadly to embrace all the variations of the example embodiments disclosed.

Although the present invention and some of its advantages have been described in detail for some embodiments, it should be understood that various changes, substitutions and alterations can be made herein without departing from the spirit and scope of the invention as defined by the appended claims. Although an embodiment of the invention may achieve multiple objectives, not every embodiment falling within the scope of the attached claims will achieve every objective. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method to determine a value of an option, the option dependent upon a stochastic variable, the method comprising:
  receiving on a processor a specification of permissible error for the determination;
  receiving on the processor a function indicating the weight to be assigned in measuring error of the determination (error weight function), receiving a specification of an evolution of the stochastic variable;
  receiving on the processor a specification of a relationship between the option and the stochastic variable;
  apportioning on the processor the specification of permissible error among a plurality of time periods;
  evolving on the processor the error weight function through the plurality of time periods, wherein evolving the weight function from one time period to the next is determining the weight function at the next time period based upon the weight function at the previous time period and upon the evolution of the stochastic variable;
  determining on the processor values of the stochastic variable at the plurality of time periods, wherein:
    the determination of a value for one of the plurality of time periods is within the permissible error apportioned for the one of the plurality of time periods; and
    the determining values comprises weighting an estimate of an error of the determination of the value for the one of the plurality of time periods by the error weighting function;
  determining on the processor the value of the option, responsive to the determination of the values of the stochastic variable at the plurality of time periods; and
  storing on the processor the value of the option in a buffer.

2. The method of claim 1, wherein:
the stochastic variable represents the price of one or more underlyings; and
the option constitutes a financial derivative based upon the one or more underlyings.

3. The method of claim 1, wherein receiving the error weight function, receiving the specification of an evolution of the stochastic variable, and receiving the specification of a relationship between the option and the stochastic variable comprise providing a library of functions and receiving the error weight function, the specification of an evolution of the stochastic variable, and the specification of a relationship between the option and the stochastic variable from the library.

4. The method of claim 1, wherein receiving the error weight function, receiving the specification of an evolution of the stochastic variable, and receiving the specification of a relationship between the option and the stochastic variable comprise receiving through a general user interface the error weight function, the specification of an evolution of the stochastic variable, and the specification of a relationship between the option and the stochastic variable.

5. The method of claim 1, wherein evolving the error weight function comprises:
selecting a number N and a number m;
generating N random points, a point comprising a value of the stochastic variable at a time period and an error term;
evolving the N points to a next time period;
determining an element containing the N evolved points;
checking whether the element contains more than m of the N evolved points;
splitting the element into two sub elements along the direction associated with the largest component of density gradient when the element contains more than m points; and
if a sub element has no more than m points, setting:

$$\psi_{t+1}(x) = \frac{1}{N} \frac{n_j}{V_j},$$

where
$\psi_{t+1}(x)$ is the assigned value of the error weight function at the next time period for an input x;
x is one of the points contained in the sub element;
the sub element contains $n_j$ points; and
the sub element has volume $V_j$.

6. The method of claim 1, wherein determining the value of the option comprises:
receiving a range of values for the stochastic variable; and
determining the option along with an error estimate for the range of values of the stochastic variable.

7. The method of claim 1, wherein determining the value of the option comprises:
simultaneously determining values of the stochastic variable for a range of values of the stochastic variable; and
applying the determined values to risk analysis.

8. The method of claim 1, further comprising:
determining a value of the option at one of the plurality of time periods, comprising:
generating N random points representing values of an underlying, the stochastic variable representing the price of the underlying, at the one of the plurality of time periods;
determining values of the option responsive to the N random points;
regressing the values of the option on basis functions of the N random points to determine an error of approximation;
determining if the error of approximation is greater than an error apportioned to the one of the plurality of time periods;
determining the best direction to divide the N random points if the error of approximation is greater than the specification of permissible error apportioned to the one of the plurality of time periods; and
splitting the N random points into two subsets of points along the best direction if the error of approximation is greater than specification of permissible error apportioned to the one of the plurality of time periods.

9. A method to determine the value of an option, the option dependent upon a stochastic variable, the method comprising:
generating on a processor a specification of permissible error for the determination;
generating on the processor a function indicating the weight to be assigned in measuring error of the determination (error weight function);
generating on the processor a specification of the evolution of the stochastic variable among a plurality of time periods;
generating on the processor a specification of the dependency of the option on the stochastic variable;
transmitting by the processor the specification of permissible error, the error weight function, the specification of the evolution of the stochastic variable, and the specification of the dependency of the option on the stochastic variable; and
receiving on the processor a determination of the value of the option within the permissible error for the determination, wherein the determination apportioned the specification of permissible error among the plurality of time periods.

10. An apparatus to determine a value of an option, the option dependent upon a stochastic variable, the apparatus comprising:
memory;
one or more processors;
a receiver to receive a specification of permissible error, of a function indicating the weight to be assigned in measuring error of the determination (error weight function), of an evolution of the stochastic variable, and of a relationship between the option and the stochastic variable, wherein evolving the weight function from one time period to the next is determining the weight function at the next time period based upon the weight function at the previous time period and upon the evolution of the stochastic variable;
an apportioner to apportion the specification of permissible error among a plurality of time periods;
a forward sweep module to evolve the error weight function through the plurality of time periods; and
a backward sweep module to determine values of the stochastic variable at the plurality of time periods, wherein the determination of a value for one or more of the time periods is within the permissible error apportioned for the time period and the backward sweep module is to determine the permissible error by weighting an estimate of an error of a determination of a value of the stochastic variable by the error weighting function;
and to determine the value of the option, responsive to the determination of the values of the stochastic variable at the plurality of time periods.

11. The apparatus of claim 10, further comprising a library of functions to specify an error weight function, an evolution of the stochastic variable, and a relationship between the option and the stochastic variable.

12. The apparatus of claim 10, further comprising a general user interface to receive a specification of permissible error, of a relationship between the option and the stochastic variable, and of an evolution of the stochastic variable.

13. A computer program product comprising a computer useable medium having a computer readable program, wherein the computer readable program when executed on a computer causes the computer to:
receive a specification of permissible error for the determination;
receive a function indicating the weight to be assigned in measuring error of the determination (error weight function);
receive a specification of an evolution of the stochastic variable;
receive a specification of the relationship between the option and the stochastic variable;
apportion the specification of permissible error among a plurality of time periods;
evolve the error weight function through the plurality of time periods, wherein evolving the weight function from one time period to the next is determining the weight function at the next time period based upon the weight function at the previous time period and upon the evolution of the stochastic variable;
determine values of the stochastic variable at the plurality of time periods, wherein the determination of a value for one of the plurality of time periods is within the permissible error apportioned for the one of the plurality of time periods; and
the determining values comprises weighting an estimate of an error of the determination of the value for the one of the plurality of time periods by the error weighting function;
determine the value of the stochastic variable, responsive to the determination of the values of the option at the plurality of time periods; and
store the value of the option in a buffer.

14. The computer program product of claim 13, wherein:
the stochastic variable represents the price of one or more underlyings; and
the option constitutes a financial derivative based upon the one or more underlyings.

15. The computer program product of claim 13, wherein receiving the error weight function, receiving the specification of an evolution of the stochastic variable, and receiving the specification of a relationship between the option and the stochastic variable comprise providing a library of functions and receiving the error weight function, the specification of an evolution of the stochastic variable, and the specification of a relationship between the option and the stochastic variable from the library.

16. The computer program product of claim 13, wherein receiving the error weight function, receiving the a specification of an evolution of the stochastic variable, and receiving the specification of the relationship between the option and the stochastic variable comprise receiving through a general user interface the error weight function, the specification of an evolution of the stochastic variable, and the specification of the relationship between the option and the stochastic variable.

17. The computer program product of claim 13, wherein evolving the error weight function comprises:
selecting a number N and a number m;
generating N random points, a point comprising a value of the stochastic variable at a time period and an error term;
evolving the N points to a next time period;
determining an element containing the N evolved points;
checking whether the element contains more than m of the N evolved points; and
splitting the element into two sub elements along the direction associated with the largest
component of density gradient when the element contains more than m points.

18. The computer program product of claim 13, wherein determining the value of the option comprises:
receiving a range of values for the stochastic variable; and
determining the option along with an error estimate for the range of values of the stochastic variable.

19. The computer program product of claim 13, wherein determining the value of the option comprises:
simultaneously determining values of the stochastic variable for a range of values of the stochastic variable; and
applying the determined values to risk analysis.

20. The computer program product of claim 13, further comprising:
determining a value of the option at one of the plurality of time periods, comprising:
generating N random points representing values of an underlying, the stochastic variable representing the price of the underlying, at the one of the plurality of time periods;
determining values of the option responsive to the N random points;
regressing the values of the option on basis functions of the N random points to determine an error of approximation;
determining if the error of approximation is greater than an error apportioned to the one of the plurality of time periods;
determining the best direction to divide the N random points if the error of approximation is greater than the specification of permissible error apportioned to the one of the plurality of time periods; and
splitting the N random points into two subsets of points along the best direction if the error of approximation is greater than specification of permissible error apportioned to the one of the plurality of time periods.

21. The method of claim 1, wherein determining the values of the stochastic variable at the plurality of time periods comprises determining the values, wherein the determination of a value for each time period of the plurality of time periods is within the permissible error apportioned for the time period of the plurality of time periods.

22. The claim of method 1, wherein the error is calculated by the formula:

$$\text{error} = \int d\psi(x) |\delta_0(x)|,$$

where
ψ is the error weight function;
$v_0(x)$ is a discounted value of the option at time t=0,
$\delta_0(x)$ is an error of $v_0(x)$, and
$v_0(x) = \hat{v}_0(x) + \delta_0(x)$, with $\hat{v}_0(x)$ denoting a determination of the discounted value of the option.

23. The claim of method 1, wherein determining values of the stochastic variable at the plurality of time periods comprises determining values of the stochastic variable at the plurality of time periods, wherein the determination of a value for each of the plurality of time periods is within the permissible error apportioned for the time period.

* * * * *